United States Patent [19]

Glance et al.

[11] Patent Number: 5,150,935

[45] Date of Patent: Sep. 29, 1992

[54] ELASTOMERIC ENERGY ABSORBING MECHANISM FOR VEHICLE BUMPERS

[75] Inventors: Patrick M. Glance, Plymouth; Paul Glance, Troy, both of Mich.

[73] Assignee: Concept Analysis Corp., Plymouth, Mich.

[21] Appl. No.: 612,588

[22] Filed: Nov. 6, 1990

[51] Int. Cl.⁵ .............................................. B60R 19/30
[52] U.S. Cl. ................................................... 293/136
[58] Field of Search ................................ 293/132, 136

[56] References Cited

U.S. PATENT DOCUMENTS

| | | | |
|---|---|---|---|
| 4,252,355 | 2/1981 | Goupy et al. | 293/132 X |
| 4,278,282 | 7/1981 | Roubinet et al. | 293/132 |
| 4,413,856 | 11/1983 | McMahan et al. | 293/132 X |
| 4,460,205 | 7/1984 | Glance | 293/136 X |
| 4,573,724 | 3/1986 | Campen | 293/136 |
| 4,816,673 | 3/1989 | Segerson et al. | 250/227.11 X |
| 4,830,418 | 5/1989 | Gest | 293/155 X |
| 4,860,641 | 8/1989 | Spears | 417/269 X |
| 4,991,045 | 2/1991 | Oberg | 360/104 |
| 4,995,660 | 2/1991 | Horansky et al. | 293/132 |

FOREIGN PATENT DOCUMENTS

| | | | |
|---|---|---|---|
| 2129526 | 12/1972 | Fed. Rep. of Germany | 293/136 |
| 2229526 | 3/1973 | Fed. Rep. of Germany | 293/136 |
| 249856 | 11/1986 | Japan | 293/136 |

Primary Examiner—Margaret A. Focarino
Assistant Examiner—Gary C. Hoge
Attorney, Agent, or Firm—Waters & Morse

[57] ABSTRACT

An elastomeric energy absorbing bumper mounting mechanism for a vehicle comprises an energy absorbing block formed of an elastomeric material, desirably a crystalline thermoplastic polyester material, formed into an intersecting grid of elastomeric walls, with a stiffer inboard side than outboard side, thickened peripheral end walls, triangular reinforcing cells, tapered cell walls, thickened posts at the intersections of certain walls, and a portion of partial length cells. The block is heat staked to rigid end plates at each end to form energy absorbing units, and the end plates are bolted to a bumper beam and vehicle rail plates. Two energy absorbing units support the bumper beam and are easily replaceable and adaptable to other vehicles.

33 Claims, 11 Drawing Sheets

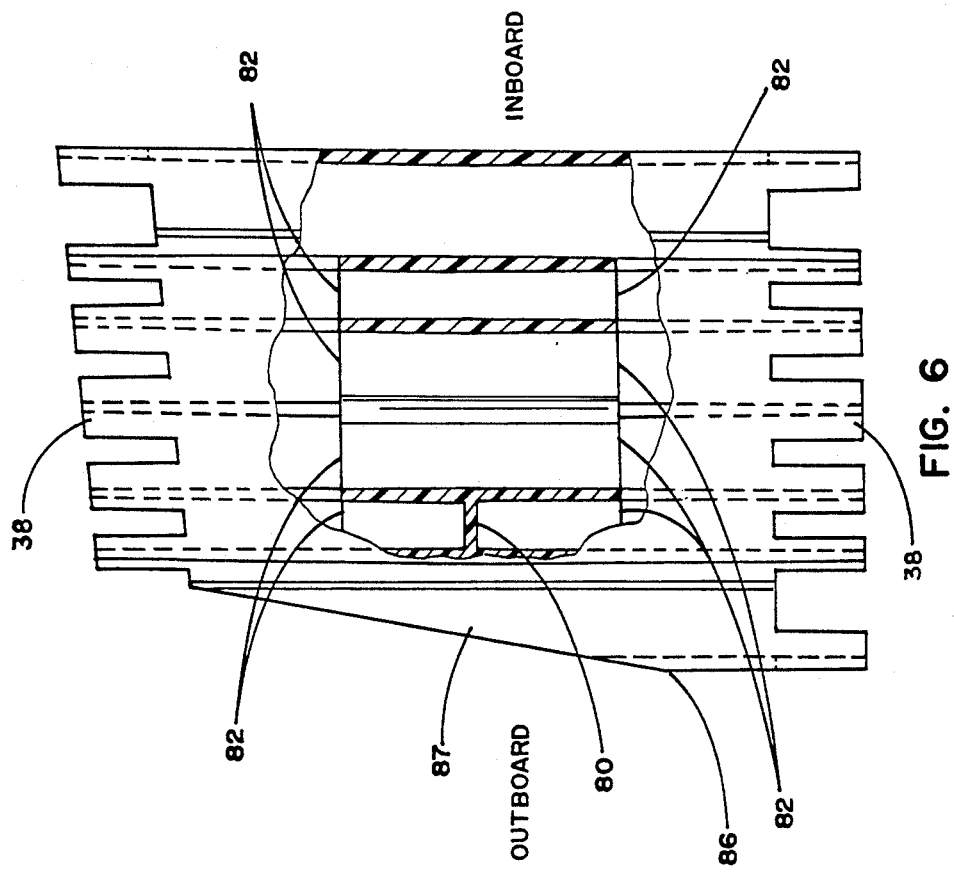
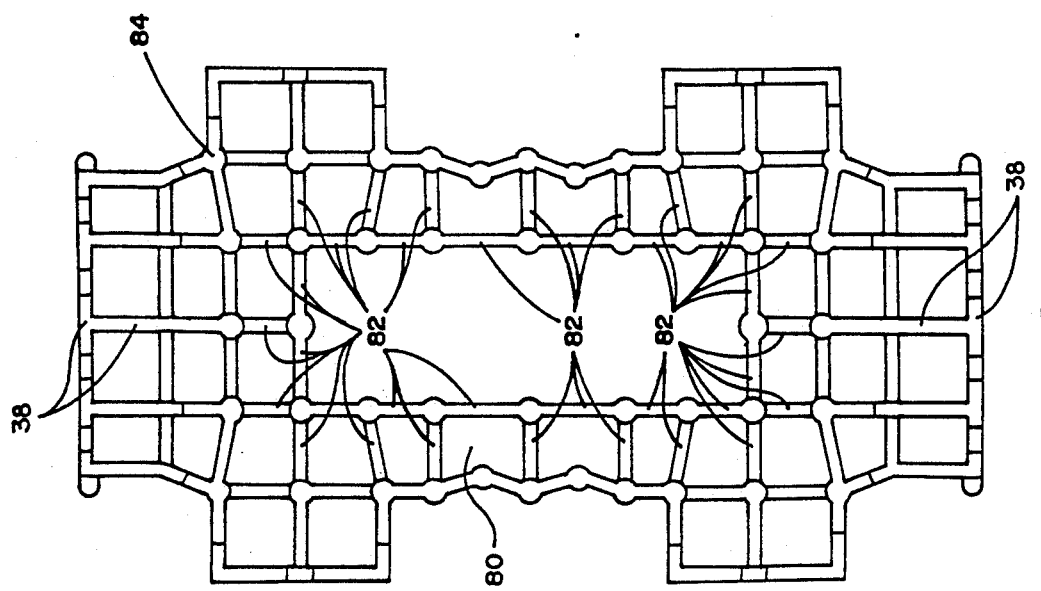

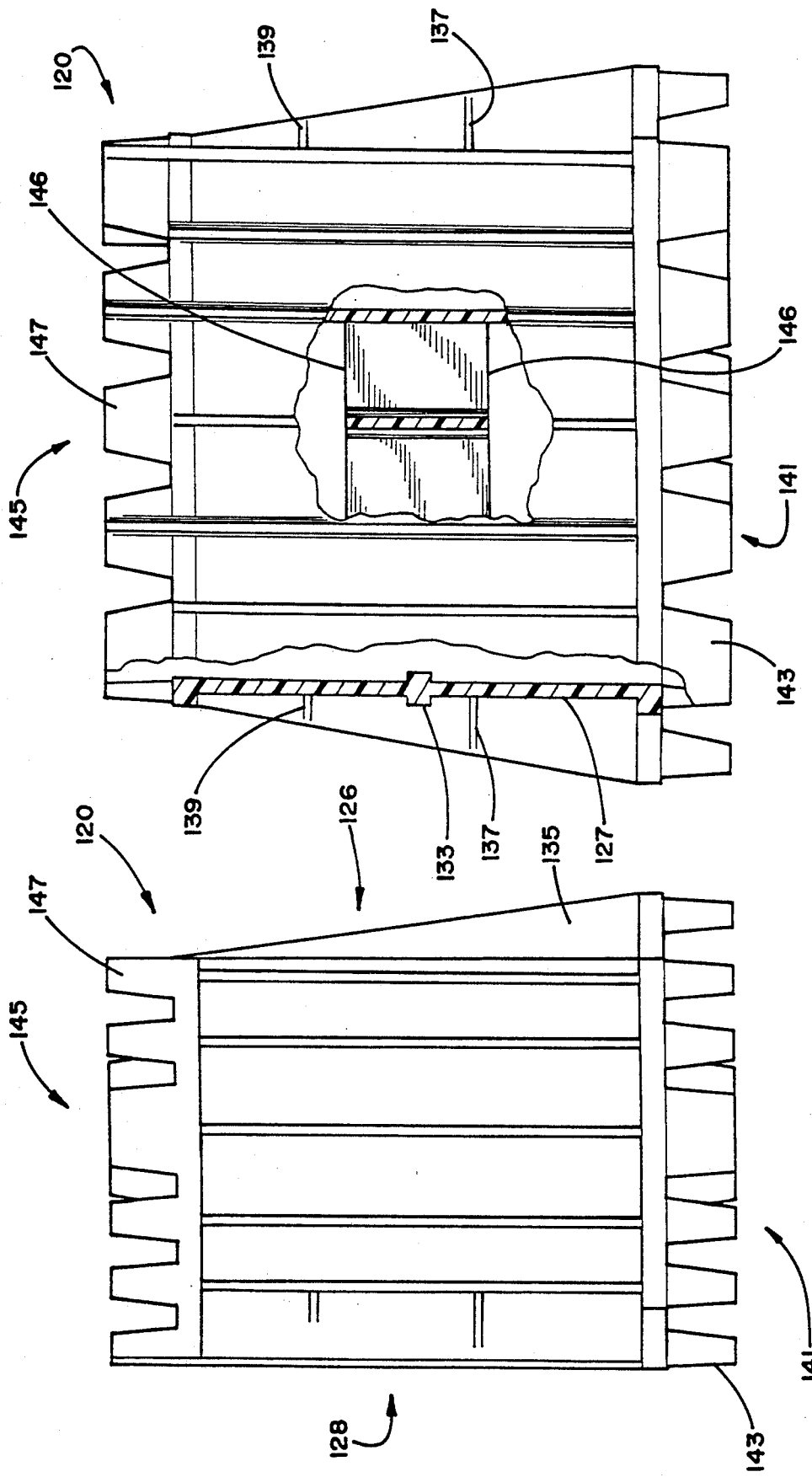

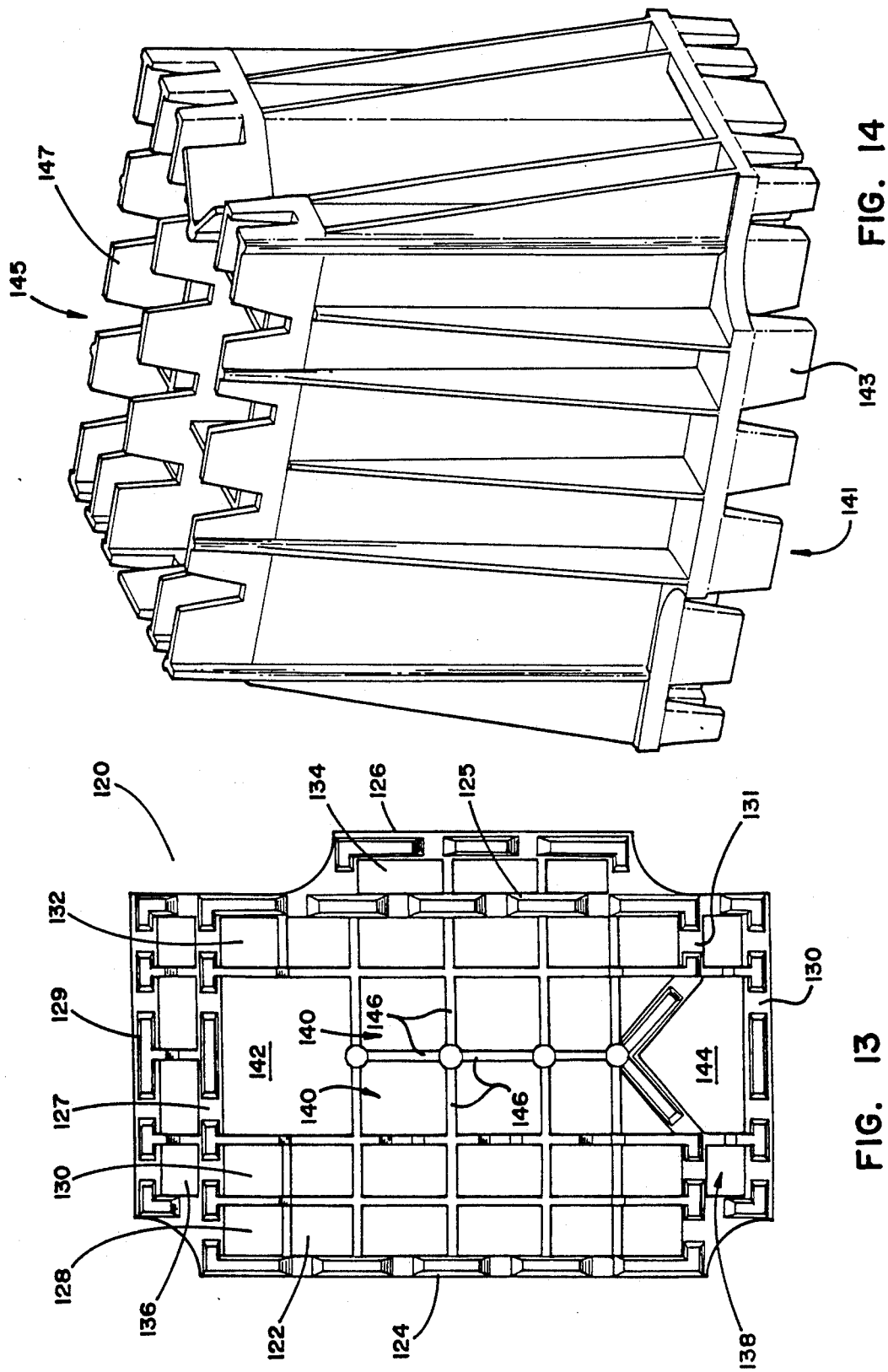

ELASTOMERIC ENERGY ABSORBING MECHANISM FOR VEHICLE BUMPERS

BACKGROUND OF THE INVENTION

This invention relates to bumper mounting mechanisms for vehicles and especially to an improved elastomeric energy absorbing unit for automobile bumper systems.

A number of different types of energy absorbing devices have been developed for mounting bumpers on automobiles, in order to absorb energy from an impact on the bumper without transmitting the energy to the vehicle. One type of energy absorber is a common spring. Another type of energy absorber is a shock absorber type of mounting mechanism. A shock absorber has an advantage over a spring, because it has the capability of absorbing a greater amount of impact energy than a spring.

While shock absorber type mounting mechanisms provide good energy absorbing characteristics, they have moving parts and are expensive. Further, they can corrode and lose their effectiveness.

As a less expensive alternative to shock absorbers, some bumper assemblies have been developed with elastomeric energy absorbers, wherein a compressible elastomeric material is used instead of a spring or shock absorber. Elastomeric materials generally are less expensive and involve no moving parts and can provide good energy absorbing characteristics. Typically, such energy absorbers are incorporated in the cavity of a bumper beam and are mounted so that the weight of the bumper beam is carried by the vehicle frame or rail, with the elastomeric material being subject only to compressive forces resulting from impacts on the bumper. Such elastomeric units are designed for specific vehicles and specific bumper assemblies, and a completely new elastomeric unit must be developed for each vehicle. This involves additional time and expense. The necessity of new injection molding dies and the like for each new elastomeric unit increases the cost of these units.

One object of the present invention is to provide an improved elastomeric energy absorbing unit for vehicle bumper assemblies wherein improved energy absorbing characteristics are provided at a low cost.

A further object of the present invention is to provide an efficient energy absorbing unit that can be adapted for use on a wide variety of bumper assemblies in a wide variety of automobiles, thus reducing costs substantially by making it possible to amortize die costs over a larger number of vehicles.

SUMMARY OF THE INVENTION

In accordance with the present invention, an elastomeric mounting mechanism for a vehicle bumper system comprises a resiliently collapsible energy absorbing block molded, extruded or otherwise formed from an elastomeric material, preferably a synthetic resin having an improved egg crate configuration comprising a plurality of parallel elongated tubular channels extending between front and rear ends of the block. Rigid end plates are mounted on opposite ends of the blocks. Preferably, thermoplastic tabs on the blocks extend through openings in the end plates and are heat staked to chemically and mechanically bond the end plates to the thermoplastic block. A pair of energy absorbing units are used to suspend a bumper beam from a pair of vehicle frame rails, with a rear end plate on each unit being bolted or otherwise fastened to one of the rails and the bumper beam being bolted or otherwise fastened to front end plates on the energy absorbing units. The energy absorber mechanism of the present invention thus supports the vertical weight of the bumper as well as absorbing rearward impact forces on the bumper and supporting the bumper during towing or jacking. The energy absorber then resiliently returns to its original shape after the impact load is removed.

The elastomeric blocks of the present invention are configured in a special way, described herein, to provide force-deflection properties that approach an optimal square wave design, while at the same time providing ample support for the bumper beam and a smooth end-to-end collapse pattern that resists torsional and bending stresses on the block.

With the present invention, a single elastomeric block can be used with a number of different vehicles and bumper configurations, simply by using different end plates on the elastomeric block or by providing a different pattern of bolt mounting holes for mounting the bumper beam and vehicle rails to the elastomeric blocks. Different end plates can have different configurations and mounting holes and need only have in common a common pattern of heat stake tab openings for mounting the end plates to the elastomeric blocks. Similarly, with a relatively few different sizes and configurations of elastomeric blocks, energy absorbing units can be provided for a wide variety of automobiles of different sizes and configuration, thus reducing considerably the manufacturing cost of the units and simplifying mounting and replacement of energy absorbing units for vehicles.

Aside from facilitating mounting and replacement of energy absorbing units, the rigid end plates heat staked to the opposite ends of the blocks serve to distribute impact forces evenly over the blocks and insure a uniform smooth collapse of the blocks under impact. This improves the life and performance of the energy absorbing units. Alternative means for attaching the end plates to the blocks include integral insert molding and the use of bolts.

These and other features and advantages of the present invention are described and shown herein in connection with the preferred embodiments of the present invention.

BRIEF DESCRIPTION OF THE DRAWINGS

FIG. 1A is a cross-sectional view along line 1A—1A of FIG. 1.

FIG. 6 is a plan view of the elastomeric block of FIG. 2.

FIG. 7 is an elevational view of the end of the elastomeric block of FIG. 6 that faces the vehicle rail.

FIG. 11 is a plan view of another embodiment of an energy absorbing block.

FIG. 12 is a side elevational view of the block of FIG. 11, partially broken away to show the interior of the block..

FIG. 13 is a front elevational view of the block of FIG. 11.

FIG. 14 is a perspective view of the block of FIG. 11.

DETAILED DESCRIPTION OF PREFERRED EMBODIMENTS

Figure 1:
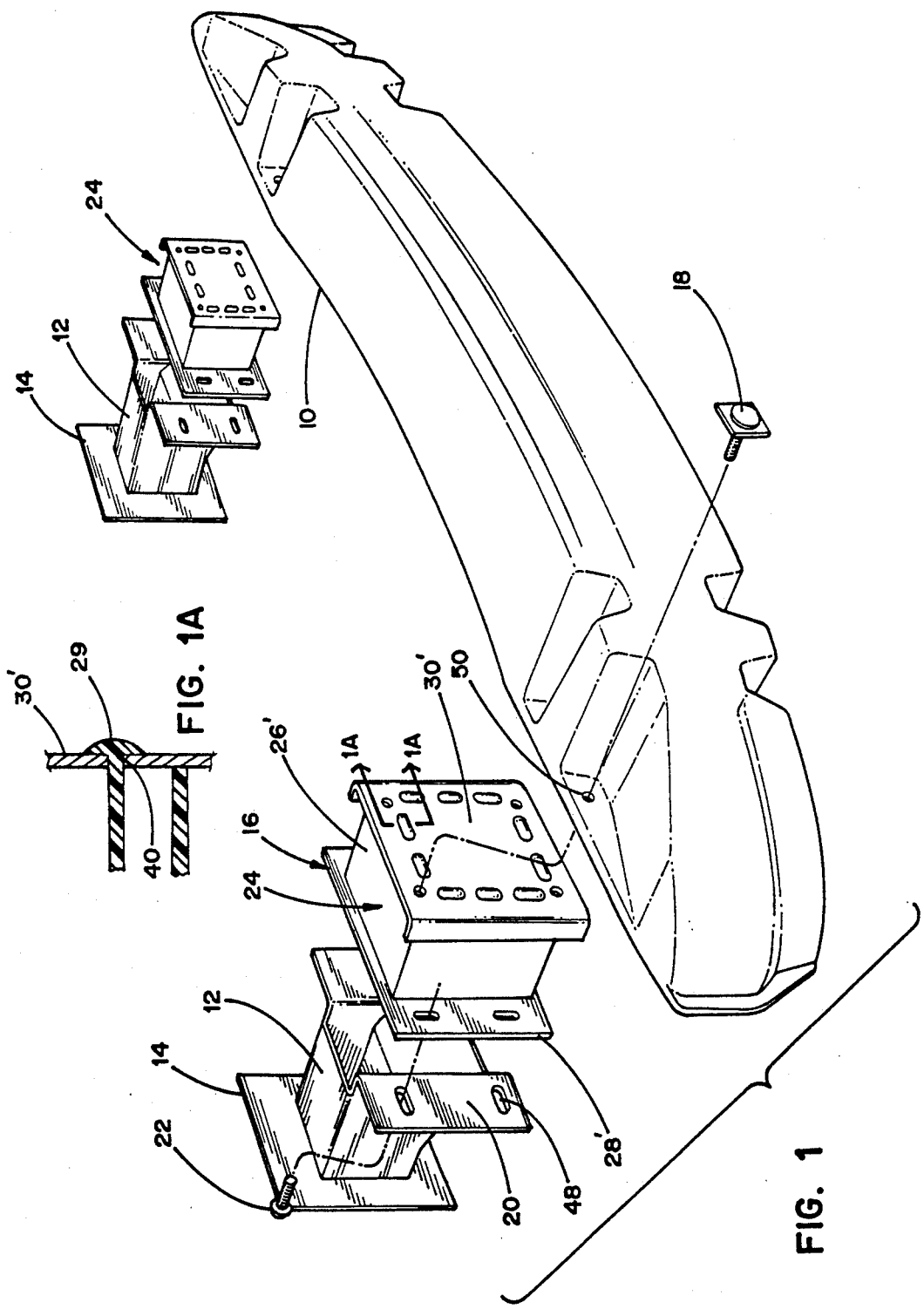
FIG. 1 is an exploded perspective view showing a bumper system incorporating the elastomeric bumper mounting mechanism of the present invention.

Referring now to the drawings, a bumper beam 10 is attached to a vehicle rail 12 of vehicle 14 by means of an energy absorbing elastomeric mounting mechanism 16 of the present invention. Mounting mechanism 16 comprises a pair of energy absorbing units 24 bolted to the bumper by means of bolts 18 and bolted by means of bolts 22 to a pair of flat vertical rail plates 20 mounted on the outer ends of vehicle frame rails 12. In a typical application, a bumper is mounted on a vehicle by a pair of spaced vehicle rails extending forwardly or rearwardly from the vehicle.

Figure 2:
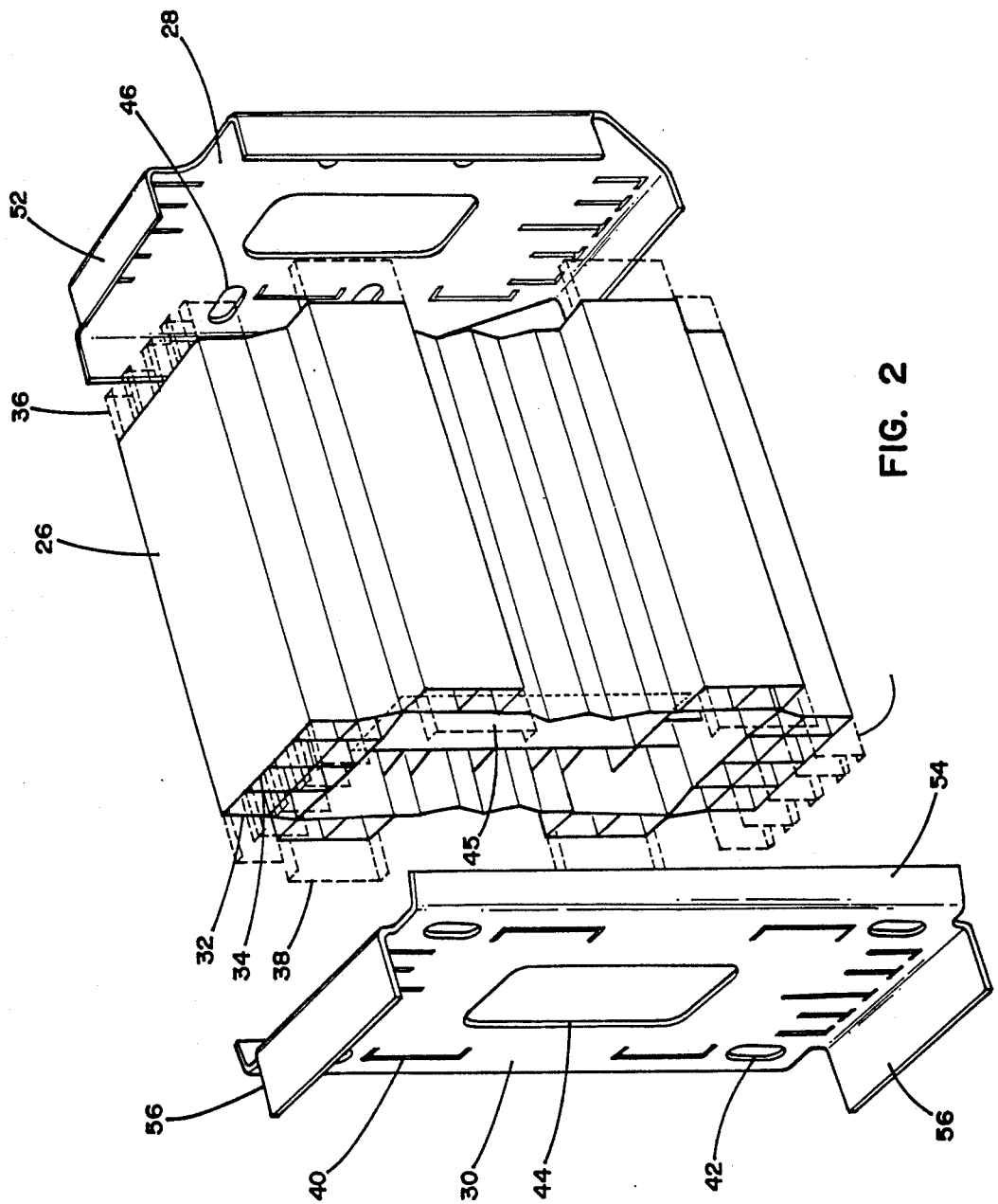
FIG. 2 is an exploded perspective view of the bumper mounting mechanism of the present invention.

Each energy absorbing unit 24 comprises a central elastomeric block 26 mounted between a rear end plate 28 and a front end plate 30, as shown in FIG. 2. Slightly different configurations of these elements are shown in FIG. 1 and are indicated by numerals 26', 28' and 30' respectively.

Each elastomeric block 26 desirably has an egg crate or grid configuration, comprising a series of elongated parallel channels 32 extending in the block between a front end 34 of the block and a rear end 36 of the block adjacent respective front and rear end plates. In the illustrated embodiment the channels are separated by a rectangular grid of intersecting vertical and horizontal walls, with each channel and its surrounding walls constituting one cell of the elastomeric block. Cell shapes other than rectangular or square are feasible.

The elastomeric blocks are formed of an elastomeric material such as a thermoplastic resin which can be molded in its desired configuration by injection molding or other known molding processes. Other processes such as extrusion or fabrication also could be used. Because the blocks not only cushion impact forces but also support the weight of the bumper through a vertical shear force, the material from which the blocks are made is important. The bumper should be supported without sagging over time through "creep" (permanent deformation of the plastic). Desirably, the resin should be a crystalline plastic such as a polyester copolymer and should have a zero creep limit of at least 100 psi at room temperature and of at least 25 psi at 180 degrees Fahrenheit. Preferably, the material should have a zero creep limit at a level of at least 500 psi at room temperature. With regard to resilience, the material should be capable of at least 200% elastic elongation and preferably should be capable of 300–400% elastic elongation. Finally, the ultimate tensile strength of the material should be at least 1000 psi and preferably at least 3000 psi. A desirable resin is a polyester copolymer sold under the trademark "Hytrel", which is manufactured by Dupont. This product has good resilience characteristics to resist bumper impacts (about 300–500% elongation) and is also sufficiently strong to support the bumper without sagging. The zero creep limit of this material is sufficiently high over the projected temperature range (up to 180 degrees Fahrenheit) that the weight of the bumper can be supported without the bumper sagging over time due to creep. Other plastic resins also can be employed to accomplish this purpose.

An important feature of the present invention is the end plates secured to the ends of the elastomeric blocks and the manner in which they are secured. As shown in FIG. 2, portions of the walls of the elastomeric blocks extend outwardly beyond the ends of the blocks forming heat stake tabs 38 (shown in phantom in the drawings for clarity of illustration). The tabs are formed at least around the outer periphery of the block. Because these tabs will support the vertical weight of the bumper, it is desirable that a substantial number of the tabs be formed from the vertical walls of the block so that they have maximum resistance to vertical shear and deflection forces exerted on the tabs. Tabs 38 fit through mating slots 40 in the respective end plates.

As shown in FIG. 1A, the tabs are heat melted or heat welded to the respective end plates after they are inserted through the slots or openings. A hot tool or hot air is placed against the portions of the tabs extending outwardly from the openings, causing the tabs to melt and flow outwardly over the openings. The flow of the melted tabs to form a T-shaped rivet type head 29 produces a mechanical bonding, as well as a chemical bonding between the melted tabs and the end plate. This causes the end plate to be securely fastened to the ends of the blocks by means of this heat staking process. This process assures a secure attachment between the blocks and the end plates without requiring additional fasteners or adhesives. Moreover, it permits the use of interchangeable end plates having different hole configurations or different shapes to adapt to different bumper assemblies. The only common requirement of the end plates is they have a heat stake slot opening pattern that is compatible with the heat stake tabs extending from the ends of the elastomeric blocks.

The end plates can have various configurations, depending upon the vehicle application being considered. Two different configurations are shown in FIGS. 1 and 2. The end plates desirably are substantially rigid and may be formed of one or a combination of metal, polymer, fiber reinforced polymer, and composite materials. These may be fabricated by stamping, injection molding, compression molding, or casting. The chemical bond between the heat stake tabs and the rigid end plates is enhanced when the end plates are formed of a synthetic resin and can be further enhanced by providing a heat activated chemical bond coating adhesive to the surfaces to be bonded together.

In addition to tab slots 40, which are formed around the periphery of the end plates, the end plates include openings 42 and 46 on the front and rear end plates, respectively, for bolting the end plates to the respective bumper beam or vehicle rail plates. In the FIG. 2 embodiment there is also an elongated central opening 44 which mates with an elongated opening 45 in the interior of the elastomeric block. Opening 45 in this embodiment is not dictated by any physical requirement for such an opening. In this application, the shape of the bumper and vehicle rail dictate an outer configuration of a certain size, and the energy absorbing characteristics of the block dictate a certain number of cells. These cells are located around the periphery of the block, which can leave an opening in the center of the block where no cells are required.

It should be noted that openings 42 in the end plates can be elongated or slotted so as to permit vertical and lateral adjustment of the elastomeric mounting units to adjust the position of the bumper on the vehicle. In FIG. 2, slots 42 on the front rigid plate are elongated vertically, while openings 46 on the rear plate are elongated in a horizontal direction. This permits adjustment in both the vertical and horizontal direction of the mounting unit. Similarly, the openings 48 in the vehicle rail plate and 50 in the bumper can be slotted or elongated, with the bumper assembly in FIG. 1 showing vertically elongated openings in both members.

The energy absorbing units can be attached to the bumper and vehicle rail plates by separate bolts 18 and 22 as shown in FIG. 1. Alternatively, the studs could be incorporated into or fixed to the end plates (or to the bumper or rail plates), so that they extend through the openings in the vehicle rail plate or bumper beam, to be secured thereto by nuts.

As shown in FIG. 2, rear end plate 28 has a small peripheral lip or flange 52 that center the block in the end plate. Similarly, front end plate 30 has rearwardly extending side flanges 54 that serve to center the block properly with respect to the end plate. These flanges do not transfer vertical force to the top surface of the block. Upper and lower flanges 56 extend forwardly from the front end plate.

Figure 3:
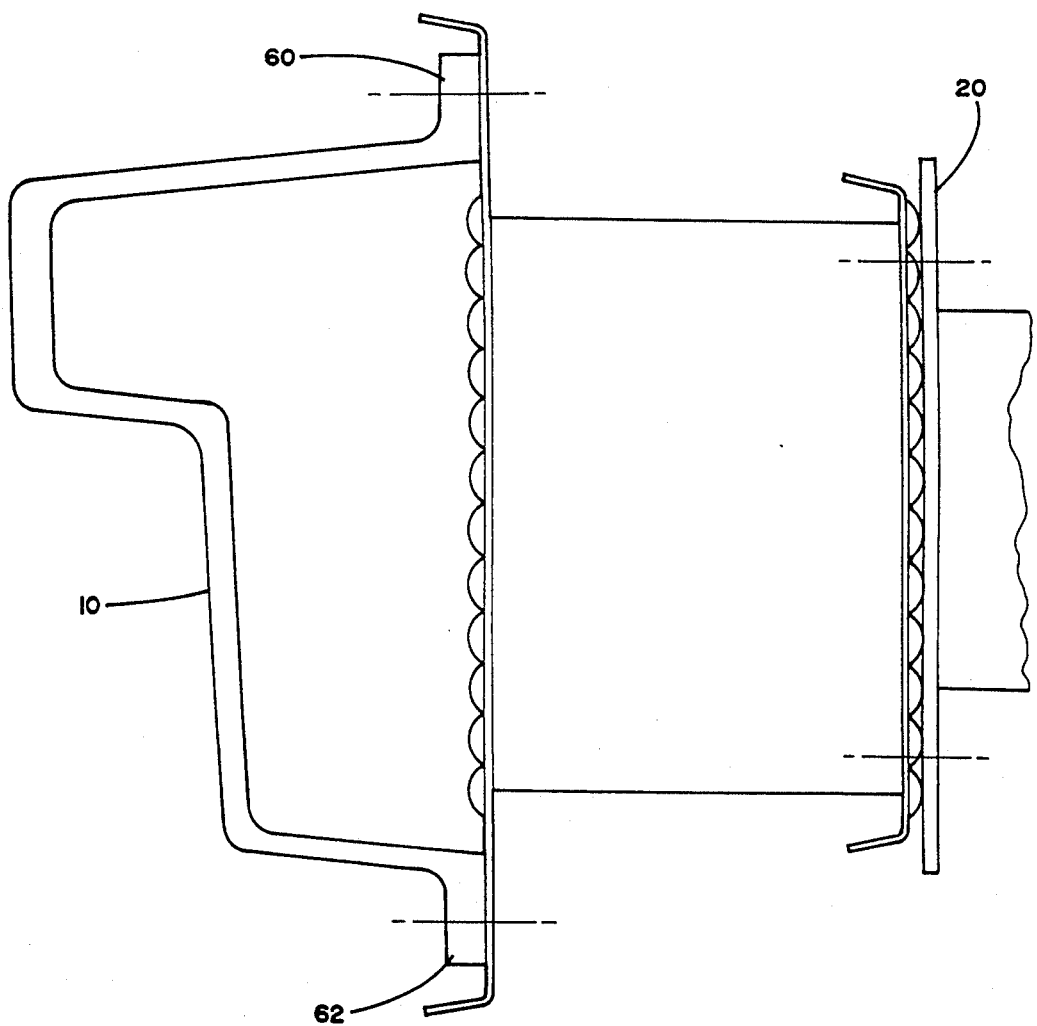
FIG. 3 is a side cross-sectional view showing a bumper beam attached to a vehicle rail by means of the elastomeric mounting mechanism of the present invention.

The manner in which a bumper beam 10 is attached to a vehicle rail plate 20 is shown in cross section in FIG. 3. Flanges of the end plates and vehicle rail plate extend outwardly beyond the periphery of the elastomeric block and are provided with openings that mate with openings in the opposed plate. Bolts extend through both plates and lock them together. The same mechanism is used to attach the bumper beam with the front rigid end plate. The bumper beam may have flanges 60 and 62 as shown in FIG. 3, and the front end plate may be bolted to these flanges by bolts. A different configuration of bumper is shown in FIG. 1 but the attachment principle is the same.

Figure 4:
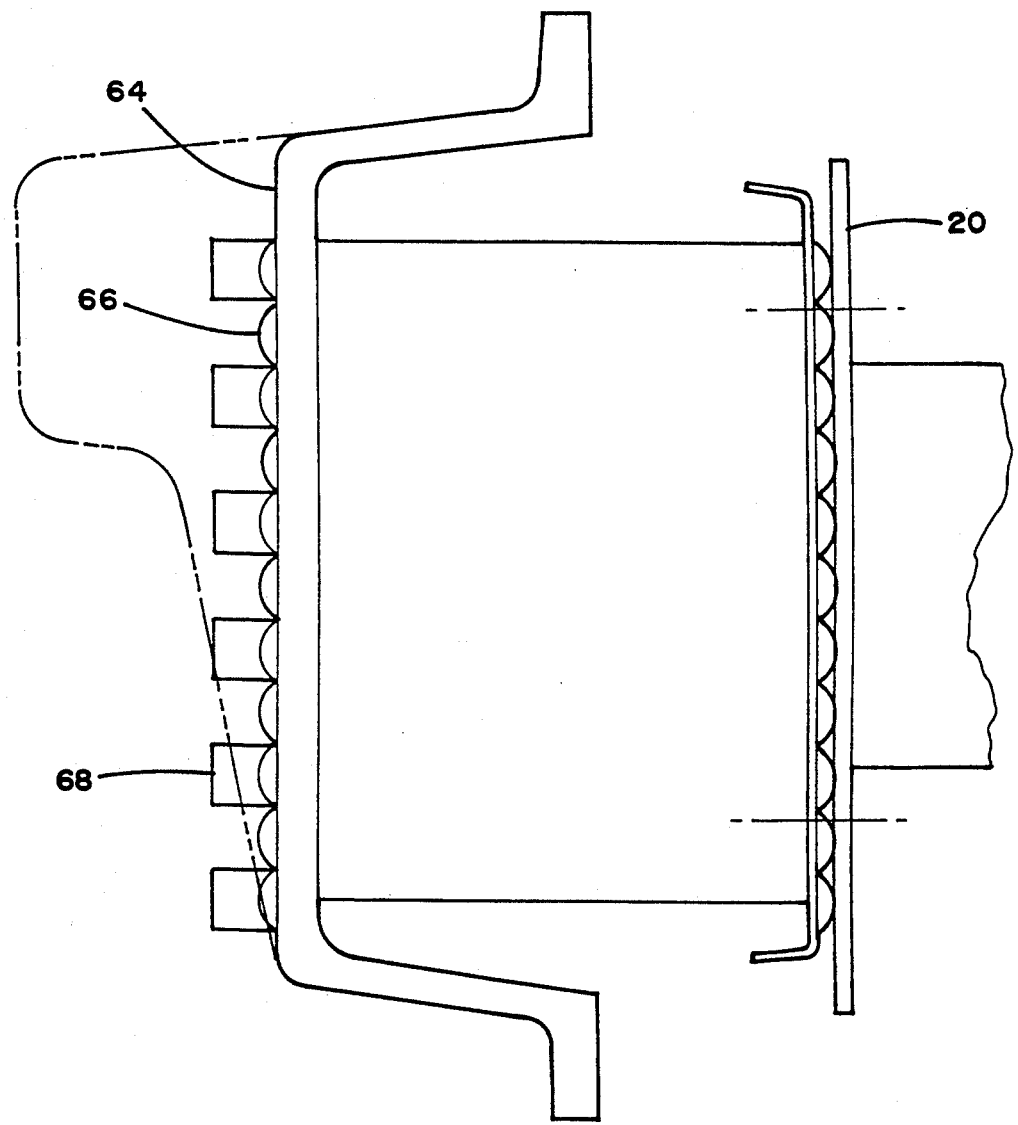
FIG. 4 is a side cross-sectional view of an alternative embodiment wherein the elastomeric block is heat staked to the bumper beam itself.

This attachment mechanism is preferred in the present invention, because it makes the mounting mechanism adaptable to a wide range of bumper applications without necessarily requiring a different configuration of the elastomeric block. Moreover attachment and replacement of the units is a simple matter of bolting and unbolting the units. However, it is also possible to mount the elastomeric block directly to a bumper 64 in the manner shown in FIG. 4, without requiring a separate front plate. In that figure, heat stake tabs 66 extend through openings 68 in the bumper and are heat staked or melt welded to attach the elastomeric block to the bumper.

Figure 5:
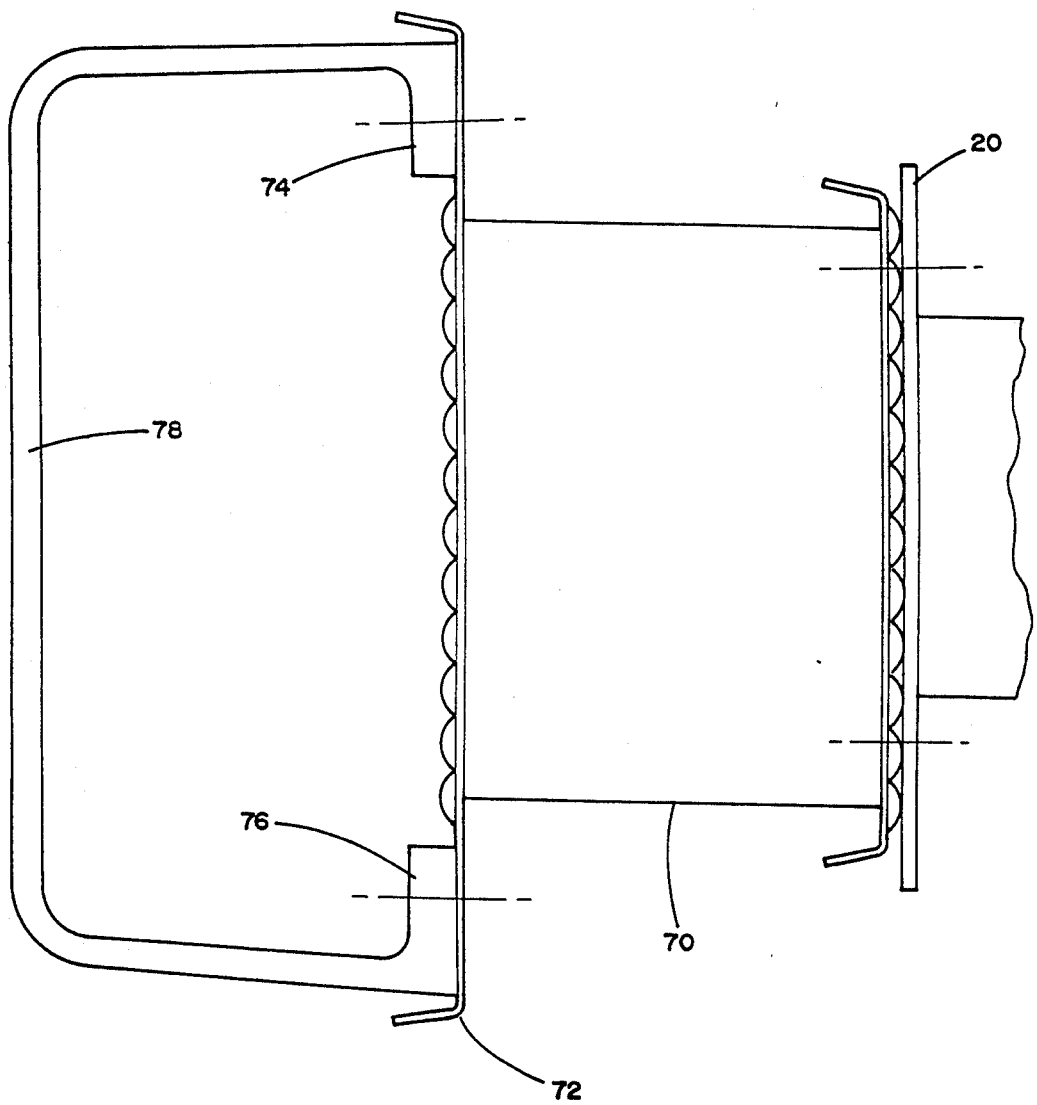
FIG. 5 is a side cross-sectional view of another alternative embodiment wherein the elastomeric block is heat staked to a close-off plate attached to the bumper beam.

Similarly, in FIG. 5, the elastomeric block 70 does not have an independent front plate but is heat staked to a close-off plate 72 that extends between the upper and lower edges 74 and 76 respectively of a bumper 78. The same heat staking operation is employed. The attachment is secure in both the FIG. 4 and FIG. 5 configuration, but the heat stake tabs have to be cut or melted off to replace the units.

The configuration of the egg crate elastomeric blocks is an important feature of the present invention. The block of FIG. 2 is shown in detail in FIGS. 6 and 7. As shown, the individual cells are essentially rectangular or quadrangular shape in cross section (they could be round or another polygonal shape) and are connected together in a desired configuration to achieve a desired outer peripheral shape of the unit. As shown, the unit is longer in a vertical direction than in a horizontal direction. This provides an additional length of vertical side walls for a given number of cells. The vertical walls support the beam and resist creep and deflection.

A number of other important features are incorporated into the elastomeric block in order to improve the performance characteristics and durability of the unit. As shown in FIGS. 6, the walls of the cells are tapered inwardly as the walls extend outwardly from the middle of the block. While a taper is desirable for mold release characteristics, the taper also provides increased stability and provides for increased resistance to deflection as the block is collapsed between its ends.

Also, a central plate or web 80 can optionally be formed in at least some of the cells between the ends of the block, if necessary to increase vertical, torsional, and lateral stiffness to the unit. If the increased support is not necessary, the hollow cells can extend the entire length of the block and have open interiors.

Another aspect of the block is that not all of the cells extend the full length of the block. Some cell walls 82 terminate only part way toward the end of the block. The full length cells provide the principal resistance when an impact load is placed on the bumper. The partial length cells increase the torsional and vertical stiffness of the assembly, which in turn decreases bumper vibration during driving, without changing or increasing the impact load characteristics of the block for normal impact loads. The partial length cells also provide the proper force and stiffness for high temperature impacts where the high temperature affects the resilience characteristics of the materials. The partial length cells also provide improved ability of the elastomeric block to return to its original shape after each impact.

Another feature of the energy absorbing block is that the intersections between the vertical and horizontal walls of the cells are at least at some locations reinforced to provide a thickness greater than the wall thickness itself. This reinforcement creates a series of posts 84 at high stress locations. The posts reinforce these high stress locations and also increase the bearing surface for the rigid end plates. They also make it possible to increase the thickness of the heat stake tabs at the posts so that the heat stake tabs are more capable of supporting the weight of the bumper beam. Desirably, the posts are about twenty-five percent (25%) larger in cross sectional area than the overlapping area of the intersecting ribs or walls of the cells.

Another feature of the elastomeric blocks of the present invention is that one or more of the peripheral cells may have tapered side walls 87 extending between the ends of the block. As shown in FIG. 6, the outer vertical wall 86 of two cells extends from the rear or vehicle rail end of the block and terminates part way to the front or bumper beam end. The side walls continue as webs to the front end but taper inwardly as they extend to the front wall, giving the respective cells a triangular horizontal cross section with an open outer wall. Other polygonal shapes are possible. The tapered walls provide a buttress support for the adjacent cells and provide stability and help control the direction of compression deflection of the elastomeric block during high, low, corner or other impacts. The tapered walls control the direction of deflection of the walls as the block collapses and urges the block to collapse in a uniform manner, without twisting or turning or bulging in another direction. The block collapses in accordion fashion by folding back and forth along the longitudinal axis, with the front and rear ends of the block remaining generally in alignment. This enhances the shock absorbing characteristics of the block and improves the ability of the block to resiliently return to its original shape after the impact load is removed. This also is important because it is undesirable to have the bumper rise up or deflect downwardly when it deflects rearwardly under impact. If it were to deflect upwardly too far, the bumper could damage the grill or body of the car by upward deflection when the bumper would otherwise be sufficient to resist any damage to the vehicle.

Figure 10:
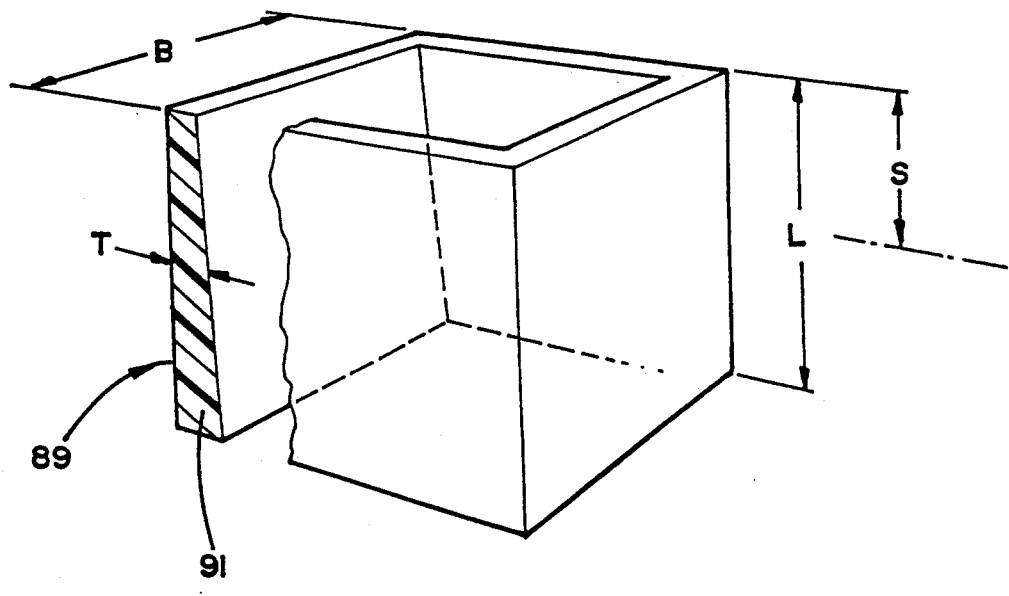
FIG. 10 is a perspective view of a typical cell of the elastomeric block of the present invention.

In order to construct energy absorbing blocks with energy absorbing characteristics approaching an ideal square wave, the individual cells 89 are constructed in accordance with particular parameters. The configurations of the individual walls 91 of the present invention are determined by the following formula, referring to the dimensions shown in FIG. 10 (the outer side of cell 89 facing upwardly in FIG. 10).

$$t = \left( \frac{4b^2 S(1-U)^2}{12LKD} \right)^{\frac{1}{2}}$$

Where:
t = average cell wall thickness
b = width of cell walls (average width if the cells are of unequal width)
L = length of cell
D = dynamic factor of particular elastomeric materials used (a known factor sometimes called rate or velocity sensitivity)
S = designed stroke (end-to-end deflection or collapse)
K = empirical stiffness factor after buckling (constant)
U = Poisson's ratio of elastomeric material The number of cells used in a block is determined by the particular load bearing capabilities desired.

Figure 8:
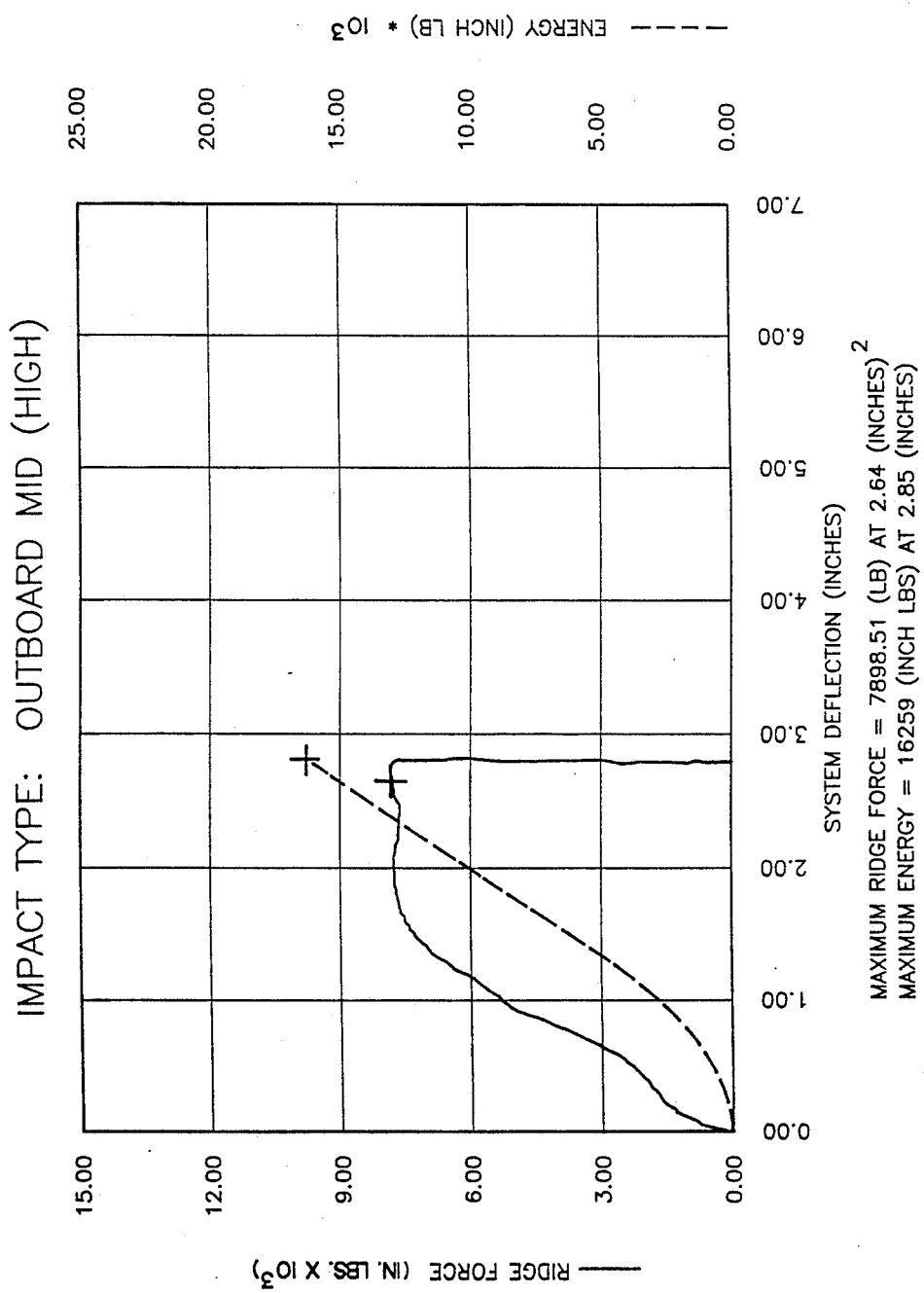
FIG. 8 is a force-deflection graph showing the energy absorbing characteristics of the present invention.

With the bumper of the present invention as constructed above, the energy absorbing characteristics are excellent. The results of actual testing with the bumper assembly of FIGS. 2, 6 and 7 are shown in the force-deflection graph of FIG. 8. This shows relatively little deflection as the force increases to a predetermined maximum force level. This maximum force level is selected for a given application to be a level at which no damage to the bumper beam or vehicle occurs. After the maximum force level is achieved, the elastomeric block buckles and collapses generally along its front to rear axis while continuing to exert the resilient maximum force level until the deflection of the block achieves a maximum distance, which is deemed to be the stroke of the elastomeric block. The stroke is determined by the amount of energy to be absorbed at the desired speed of impact (e.g., 5 miles per hour) and by the physical constraints of the position of the bumper with respect to the vehicle rail and the other body components of the car. No further deflection is desired after the bumper achieves its maximum rearward direction.

With the bumper mounting unit of the present invention, the efficiencies of an elastomeric unit are achieved while obtaining the force-deflection energy absorbing characteristics approaching an ideal square wave.

Another embodiment of an energy absorbing block 120 with further improvements is shown in FIGS. 11-13. In this embodiment, the block is formed of rectangular cells 122 designed in an asymmetrical manner, with a larger number of cells adjacent the left hand side wall 124 of the block (FIG. 13 orientation) than the right hand side wall 126 of the block 120. The left hand side is designed to be the inboard side, or the side facing the center of the vehicle, while the outboard side 126 faces the outer side of the vehicle. The wider end 141 is mounted on the vehicle rail by heat stake tabs 143, and the narrower end 145 is mounted on the bumper beam by heat stake tabs 145. The same types of end plates described above are desirably used. As shown, block 120 has two full columns 128 and 130 of six full length cells each on the inboard side, while the block has only a single column 132 of six full cells and a partial column 134 of three tapered cells on the outboard side with triangular walls 135. The top and bottom sides of the block have rows 136 and 138 respectively of four and three tapered cells. The center portion of the block has two columns of at least two and desirably four cells 140, with an enlarged open space 142 at the top and an enlarged triangular open space 144 at the bottom. Wall segments 146 are partial length walls, the length of which is shown in FIG. 12.

As shown in FIGS. 12 and 13, the ends of the walls at or adjacent the periphery of the block are reinforced so as to be thicker than normal cell wall thickness forming transverse lips on the wall ends. Desirably these ends are twice the thickness of the cell walls or about one-fifth of an inch compared with a normal cell wall thickness at the ends of about one-tenth of an inch. The reinforced ends desirably are provided in walls 124, 125, 126, 127, 129, 130, and 131. The reinforcement provides additional rigidity for the block, provides a wider bearing surface for impact loads on the ends of the blocks, and provides a wider base for heat stake tabs, which makes it possible to use wider and stronger heat stake tabs. This decreases stress concentration and increases fatigue life. The lips can be formed in the peripheral walls without special dies, but special slides are necessary in the dies to put lips on interior walls.

Additional structural integrity is provided by a transverse bar 133 integrally formed in wall 127 between the ends. This improves vertical, horizontal, and torsional stability and urges an end to end collapse of the block. Also right angle flanges 137 and 139 extend between outer cell walls and the triangular walls. These flanges provide reinforcement for the triangular walls in lieu of an outer cell wall, which is not present on the tapered portions of these cells.

The enlarged openings 142 and 144 in the block are for the purpose of providing access space for bolting the blocks to the vehicle rails and bumper beams via end plates heat staked or otherwise attached to end plates. Bolt openings are formed in the end plates opposite the openings in the blocks, and the openings provide access to bolt an end plate to a rail or beam.

Figure 15:
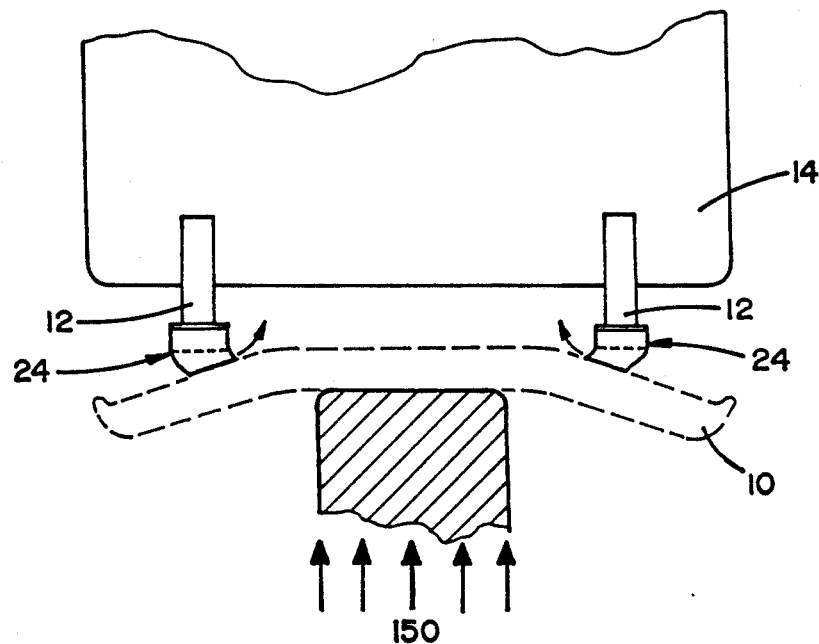
FIG. 15 is a pictorial view showing a bumper system of the present invention receiving a central impact load.

The asymmetrical shape of the block is important. As shown in FIG. 15, when an impact load 150 is received in the center of a bumper 10, this not only transmits a rearward force on the energy absorber but it also imparts a bending moment on the energy absorber, urging the energy absorber to bend in half along its inner side. If this were permitted to happen, the desirable energy absorbing characteristics obtained by a smooth, accordion like axial collapse of the block would be adversely affected. To avoid this, the inboard side of the block is made sufficiently stiffer than the outboard side that the block resists the bending moment and still collapses axially.

As an added advantage of the present invention, the formation of the mounting system in the form of separate energy absorbing units having an elastomeric center block and rigid end plates heat staked to the ends of the block provide a means for systematizing the manufacture of energy absorbing units for a wide variety of vehicles. A single energy absorbing block can be fitted to any number of bumpers simply by using end plates that have hole patterns adapted to fit different bumpers. A single end plate can have a number of hole patterns in it or different end plates can be used. The end plates need only have in common a common pattern of heat stake tab openings, so that a single elastomeric block can be mounted on different end plates.

While a single elastomeric block could conceivably be used for a number of vehicles of a common weight class, a relatively small number of blocks can be produced for a wide variety of vehicles of different weight classifications, providing different force-deflection characteristics over a range of desired characteristics. Thus, a vehicle manufacturer having a vehicle that requires energy absorption within a particular force-deflection range can select the most appropriate energy absorbing unit for his desires and can have inexpensive end plates fabricated specifically for the energy absorbing units. With this type of system, the economies of scale can reduce the cost of dies for producing energy absorbing units and the high expense of individually designing and tailoring an energy absorbing bumper system for a particular application.

Although it is desirable to fuse and lock the end plates on the block by melting the ends of the heat stake tabs over the plates during assembly, the plates also could be integrally molded to the block by insert molding the plates in the die during the block molding process. The same basic configuration of plates and blocks can be employed for such a process (see FIG. 1A).

Figure 9:
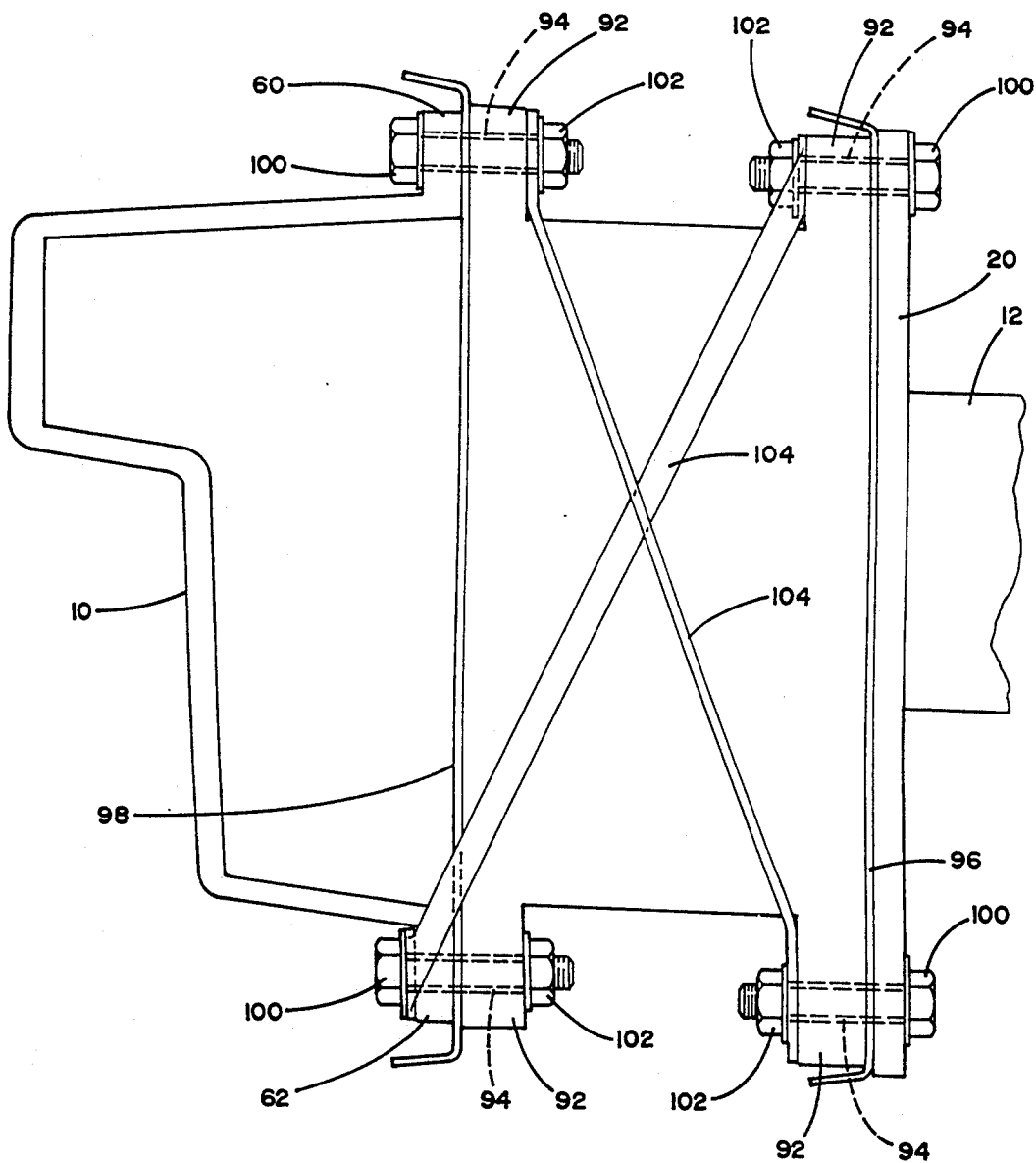
FIG. 9 is a side cross sectional view of another alternative embodiment wherein the elastomeric block is molded with internal bolt holes, and bolts are used to interconnect the blocks, end plates, bumper beams and mounting rails. Reinforcing straps also are shown with this embodiment.

Also, while heat staking or molding as above described is a successful means for mounting the end plates on the blocks, the blocks also can be bolted to the end plates, as shown in FIG. 9. In this embodiment block 90 has outwardly extending flanges 92 at both ends, with bolt holes 94 being formed in the flanges. End plates 96 and 98 have mating bolt holes for attaching the end plates to the block by bolts 100 and nuts 102. The unit can be mounted to the bumper beam 10 and vertical plate 20 on vehicle rail 12 by the same bolt fasteners as described previously, or the same bolts used to attach the block to the end plates can be used to attach the end plates to the bumper beam and vertical rail plates, through mating openings therein, as shown in FIG. 9. One or more relatively flexible tension members 104 can extend between opposite corners of the block to supplement vertical support in the bolted version of FIG. 9 or other versions. The support members can be metal straps or flexible straps that permit collapse in response to compressive impact forces but resist tension forces.

While the preferred elastomeric block of the present invention is formed in the egg crate configurations described above, it is also possible to use a semi-solid block formed of a foamed elastomeric material instead of an egg crate block.

Such a block can be shaped as shown in FIGS. 1 and 3-5 and can have heat stake tabs as shown in those figures. The collapse and resilience characteristics of a foam block are affected by the size and density of the foam block and the elastomeric material used. The same type of elastomeric material used for an egg crate block can be used for a solid foam block.

The foregoing embodiments are intended to be illustrative of the preferred practice of the present invention and are not intended to limit the scope of the invention, which is defined in the appended claims.

I claim:

1. An improved elastomeric energy absorber unit for a vehicle system, wherein the elastomeric energy absorber unit is mounted between a bumper beam and a fixed position vehicle rail so as to permit resilient, energy absorbing deflection of the bumper beam with respect to the vehicle rail within predetermined force and deflection limits designed to minimize damage to the vehicle, the elastomeric energy absorber unit comprising a resiliently collapsible energy absorbing block formed of an elastomeric material, the block having an egg crate configuration comprising a plurality of substantially parallel elongated tubular channels extending axially between front and rear ends of the block, with elastomeric walls separating adjacent channels, each channel and the walls forming the periphery thereof being a cell, the block being offset from the center of the vehicle and having an inboard side designed to face inwardly toward the center of the vehicle and an outboard side designed to face outwardly toward the side of the vehicle, the inboard and outboard sides of the block each including means for resisting axial collapse thereof, the inboard means providing greater resistance to axial collapse than the outboard means, such that the inboard side of the block is more resistant to axial collapse than the outboard side of the block, the block resisting inward bending moments and urging the block to collapse axially in a front to rear direction in response to an impact load at the center of the bumper team.

2. An elastomeric energy absorber unit according to claim 1, wherein the inboard side of the block includes a greater number of cells than the outboard side of the block.

3. An elastomeric energy absorber unit according to claim 2, wherein the inboard side of the block includes two full columns of at least six (6) cells per column and the outboard side includes a single full column of at least six (6) cells and a shorter partial column of at least three (3) cells.

4. An elastomeric energy absorbing unit according to claim 3, wherein the partial column is at the outboard periphery of the block and is adjacent the full column, the partial column having cells comprising tapered side walls extending perpendicularly out from an outer side wall of one of the full columns, the walls tapering inwardly as the walls extend from the rear to the front of the block.

5. An elastomeric energy absorber unit according to claim 2, wherein the block includes a center portion between the inboard and outboard sides, the center portion including a plurality of recessed shorter cells that extend only part of the way to the ends of the block from the middle of the block, the shorter cells increasing the stability of the block and the collapsed resiliency of the block.

6. An elastomeric energy absorber unit according to claim 5, wherein the center portion of the block includes enlarged opening means for providing access through the block, the block having rigid end plates affixed to the ends of the block, the rigid end plates in turn being attached to the bumper beam or vehicle rail, the enlarged opening means facilitating attachment of an end plate to the bumper beam or vehicle rail.

7. An elastomeric energy absorber unit according to claim 1, wherein the block comprises:
   two (2) columns of six (6) full cells at the inboard side;
   one (1) column of three (3) triangular cells outside a full column of six (6) cells on the outboard side;
   a center portion having at least two (2) recessed shorter cells and enlarged openings above and below the shorter cells for facilitating mounting of the energy absorber unit; and
   a row of triangular cells on top and bottom sides of the block, the triangular cells being wider at the end of the block abutting the vehicle rail and tapering inwardly to the end that abuts the bumper beam.

8. An improved elastomeric energy absorber unit for a vehicle system, wherein the elastomeric energy absorber unit is mounted between a bumper beam and a fixed position vehicle rail so as to permit resilient, energy absorbing deflection of the bumper beam with respect to the vehicle rail within predetermined force and deflection limits designed to minimize damage to the vehicle, the elastomeric energy absorber unit comprising a resiliently collapsible energy absorbing block formed of an elastomeric material, the block having an egg crate configuration comprising a plurality of substantially parallel elongated tubular channels extending axially between front and rear ends of the block, with elastomeric walls separating adjacent channels, each channel and the walls forming the periphery thereof being a cell, the end of at least one of the walls at at least one end of the block being thicker than the portion of the wall adjacent the end, the thicker end providing a wider and more stable base for receipt of an impact force against the end of the block the unit including rigid end plates mounted on the ends of the block, the block having thermoplastic heat stake tabs extending outwardly from at least the thickened portions of the ends of the block and fitting through mating openings in the rigid end plates, portions of the tabs extending through the end plates being melted to form enlarged rivet type heads that lock the end plates on the ends of the block, the thickened portions providing a sturdy base for the tabs and a widened bearing surface for the end plates.

9. An elastomeric energy absorber unit according to claim 8, wherein the thicker ends on the walls extend around the outer periphery of the end of the block.

10. An elastomeric energy absorber unit according to claim 8, wherein the heat stake tabs mounted on the thickened ends have bases that are thicker than the portions of the walls adjacent the thickened ends, providing more sturdy, more shear resistant tabs.

11. An elastomeric bumper mounting mechanism for a vehicle bumper system wherein a transverse bumper beam is mounted on spaced vehicle frame rails, the elastomeric mounting mechanism being mounted between the bumper beam and the rails so as to permit resilient, energy absorbing deflection of the bumper system with respect to the vehicle rails within predetermined force and deflection limits designed to minimize damage to the vehicle, the elastomeric mounting mechanism comprising an energy absorber unit for each vehicle rail, each energy absorber unit comprising:
   a resiliently collapsible energy absorbing block formed of a moldable elastomeric material, the block having an egg crate configuration comprising a plurality of substantially parallel elongated tubular channels extending between front and rear ends of the block, with elastomeric walls separating adjacent channels, each channel and the walls forming the periphery thereof being a cell, certain portions of the walls of each block at the ends thereof extending beyond the end of the block and forming heat stake tabs on the blocks;
   substantially rigid end plates mounted on the front and rear ends of the block, the end plates having openings therein through which the heat stake tabs fit, outer ends of the tabs being melted to form enlarged heads on the tabs that lock the plates on the ends of the block, the plates abutting the ends of the block and serving to distribute end to end compression forces exerted on the block over the cells of the block and urging uniform compression deflection of the block in response to such forces and urging return to original shape after each impact; and
   fastening means for attaching one end plate of the block to the bumper beam and the other end plate to the vehicle rail, whereby the bumper is suspended from the vehicle rail by the elastomeric energy absorbing unit.

12. An elastomeric bumper mounting mechanism according to claim 11, wherein the block is formed of a crystalline material having a zero creep limit of at least 100 psi at room temperature and of at least 25 psi at 180 degrees Fahrenheit and being capable of at least 200% elastic elongation and having a tensile strength of at least 1000 psi at room temperature.

13. An elastomeric bumper mounting mechanism according to claim 12 wherein the block is formed of a thermoplastic polyester elastomer having a zero creep limit of at least 500 psi and tensile strength of at least 3000 psi at room temperature.

14. An elastomeric bumper mounting mechanism according to claim 11, wherein the vehicle rails have vehicle rail plates attached to ends thereof, and the rear end plate is bolted to the vehicle rail plate, the front end plate being bolted to the bumper beam.

15. An elastomeric bumper mounting mechanism according to claim 14, wherein the openings in the end plates are elongated so as to permit adjustment of the position of end plates with respect to the bumper beam and rail plates.

16. An elastomeric bumper mounting mechanism according to claim 11 wherein the front and rear end plates are fastened respectively to the bumper beam and to rail plates on the vehicle rails, the end plates being formed with multiple sets of fastener openings that mate with the bumper beams or rail plates of more than one vehicle, such that a single energy absorber system can be used for more than one vehicle.

17. An elastomeric bumper mounting mechanism according to claim 11, wherein a single elastomeric block configuration is used for different vehicles having different end plates, the end plates for the vehicles having a common heat stake tab opening pattern, such that a single set of molds for an elastomeric block can be used to produce elastomeric blocks for different vehicles.

18. An elastomeric bumper mounting mechanism according to claim 11, wherein the block includes at least one or more modified peripheral cells wherein an outer side of the cell is tapered inwardly along its length as it extends from the rear end to the front end of the cell, giving the channel a triangular configuration, the tapered cell serving to enhance the stability of the block and to urge the block to collapse or deflect linearly in an end-to-end direction when the bumper is subjected to an impact.

19. An elastomeric bumper mounting mechanism according to claim 11, wherein adjacent walls of the egg crate block intersect in a grid pattern and at least some of the intersection portions are thickened to form longitudinal posts in the block; the posts serving to increase the bearing surface for the end plates, the posts also increasing the thickness of heat stake tabs formed from extended ends of the posts, the posts also providing extra reinforcement at high stress regions.

20. An elastomeric bumper mounting mechanism according to claim 11, wherein the block comprises a grid of contiguous cells having vertical and horizontal walls, the block being formed, such that the vertical walls of the cells support the bumper beam at a consistent height and the bumper beam does not sag over normal use thorough plastic deformation or creep of the block.

21. An elastomeric bumper mounting mechanism according to claim 20, wherein the heat stake tabs comprise vertically elongated members extending from vertical sections of cell walls, the size and number of the tabs being such that the tabs support the beam without creeping and resist shearing off during towing or jacking of the vehicle or during impact on the bumper.

22. An elastomeric bumper mounting mechanism according to claim 11, wherein the rigid end plates are formed of one or a combination of materials selected from the group consisting of metal, composite, polymer, and fiber reinforced polymer materials.

23. An energy absorbing bumper mounting mechanism according to claim 11, wherein one or more flexible straps or cables help to support bumper weight and towing and jacking loads, the flexible straps or cables being flexible so as to deflect out of the way during compression of the block but being rigid in tension to help carry the static creep load, jacking load, and tow load.

24. An elastomeric energy absorbing bumper mounting mechanism according to claim 11, wherein at least one of the cells are configured to satisfy the relationship:

$$t = \left( \frac{4b^2 S(1-U)^2}{12LKD} \right)^{\frac{1}{2}}$$

Where:

t = average thickness of cell walls
b = width of cell walls
L = length of cell
D = dynamic factor of material
S = designed stroke (deflection)
K = empirical stiffness factor after buckling (constant)
U = Poisson's ratio of elastomeric material.

25. An energy absorbing bumper mounting mechanism for a bumper system wherein a bumper beam is mounted on spaced vehicle rails, the mounting mechanism including an energy absorbing unit mounted on each vehicle rail and suspending the bumper beam from the energy absorbing units, each energy absorbing unit comprising a resiliently collapsible block formed from an elastomeric material, the block having an egg crate configuration with elongated substantially parallel channels being longitudinally oriented between front and rear ends of the block, the ends of the block having heat stake tabs extending outwardly therefrom, the heat stake tabs on the rear end of the block extending through mating openings in a substantially rigid rear end plate and being enlarged on the side opposite the block to lock the block on the end plate, the rear end plate being releasably fastened to the vehicle rail, the tabs on the front of the block extending through mating openings in a substantially vertical mounting surface for the bumper beam and being enlarged on the side opposite the block to lock the block on the vertical surface, the bumper beam being thus suspended from the vehicle rails by the blocks, without vertical supporting engagement between a horizontal side of the bumper beam and a horizontal side of the block, thereby avoiding interference between the bumper and the block as the bumper beam moves back and the block collapses under impact on the bumper beam.

26. An energy absorbing mounting mechanism for a bumper system wherein a bumper beam is mounted on spaced vehicle rails, the mounting mechanism including an energy absorbing unit mounted on each vehicle rail and suspending the bumper beam from the energy absorbing unit, each energy absorbing unit comprising a resiliently collapsible block formed from a resilient material and a pair of substantially rigid end plates mounted respectively on front and rear ends of the block, one end plate being bolted to the bumper beam and the other end plate being bolted to an outer end of the vehicle rail, such that energy absorbing units can be bolted and unbolted from the vehicle rails and the bumper beam for easy installation and replacement, the end plates also serving to distribute impact forces evenly over the ends of the blocks and assisting in guiding the blocks to collapse smoothly on impact, the block being formed of an elastomeric material having an egg crate configuration wherein a plurality of substantially parallel elongated tubular channels extend axially between front and rear ends of the block, with elastomeric walls separating adjacent channels, the end plates being mounted on the egg crate blocks by means of integrally formed tabs that extend from the ends of the elastomeric walls and fit through mating openings in the end plates, outer ends of the tabs being enlarged to a size greater than the openings so as to lock the plates on the blocks.

27. An energy absorbing bumper mounting mechanism according to claim 26, wherein the block is fabricated from an elastomeric foam material.

28. An improved elastomeric energy absorber unit for a vehicle system, wherein the elastomeric energy absorber unit is mounted between a bumper beam and a fixed position vehicle rail so as to permit resilient, energy absorbing deflection of the bumper beam with respect to the vehicle rail within predetermined force and deflection limits designed to minimize damage to the vehicle, the elastomeric energy absorber unit comprising a resiliently collapsible energy absorbing block formed of an elastomeric material, the block having an egg crate configuration comprising a plurality of substantially parallel elongated tubular channels extending axially between front and rear ends of the block, with elastomeric walls separating adjacent channels, each channel and the walls forming the periphery thereof being a cell, the block including at least one modified peripheral cell wherein an outer side of the cell is tapered inwardly along its length as it extends from the rear end to the front end of the cell, giving the channel a triangular configuration, the tapered cell serving to enhance the stability of the block and to urge the block to collapse or deflect linearly in an end-to-end direction when the bumper is subjected to an impact.

29. An improved elastomeric energy absorber unit according to claim 28 wherein at least certain of the walls at at least one end of the block have ends that are thicker than the portions of the walls adjacent the ends, the thicker ends providing a wider and more stable base for receipt of an impact force against the ends of the block.

30. An elastomeric energy absorber unit according to claim 28 wherein the block is formed of a crystalline material having a zero creep limit of at least 100 psi at room temperature and of at least 25 psi and 180 degrees Fahrenheit and being capable of at least 200% elastic elongation and having a tensile strength of at least 1000 psi at room temperature.

31. An elastomeric energy absorber unit according to claim 30, wherein the block is formed of a thermoplastic polyester elastomer having a zero creep limit of at least 500 psi and tensile strength of at least 3000 psi at room temperature.

32. An elastomeric energy absorber unit according to claim 28, wherein adjacent walls of the egg crate block intersect in a grid pattern and at least some of the intersection portions are thickened to form longitudinal posts in the block, the posts providing extra reinforcement at high stress regions.

33. An elastomeric energy absorbing unit according to claim 28, wherein the block comprises a grid of contiguous cells having vertical and horizontal walls, the block being formed such that the vertical walls of the cells support the bumper beam at a consistent height and the bumper beam does not sag over normal use through plastic deformation or creep of the block.

* * * * *